(12) United States Patent
Yamazaki et al.

(10) Patent No.: US 12,246,791 B2
(45) Date of Patent: Mar. 11, 2025

(54) BICYCLE PART AND METHOD OF FORMING BICYCLE PART

(71) Applicant: Shimano Inc., Osaka (JP)

(72) Inventors: Azusa Yamazaki, Osaka (JP); Kazutaka Niki, Osaka (JP); Takeshi Ueda, Osaka (JP); Yuuya Yoneda, Osaka (JP)

(73) Assignee: Shimano Inc., Osaka (JP)

( * ) Notice: Subject to any disclaimer, the term of this patent is extended or adjusted under 35 U.S.C. 154(b) by 1007 days.

(21) Appl. No.: 17/221,235

(22) Filed: Apr. 2, 2021

(65) Prior Publication Data

US 2022/0315155 A1 Oct. 6, 2022

(51) Int. Cl.
*B62J 45/20* (2020.01)

(52) U.S. Cl.
CPC ..................... *B62J 45/20* (2020.02)

(58) Field of Classification Search
CPC ................... B62J 45/20; B60K 1/00
See application file for complete search history.

(56) References Cited

U.S. PATENT DOCUMENTS

| | | | |
|---|---|---|---|
| 4,150,553 A | 4/1979 | Aucktor | |
| 6,418,797 B1 | 7/2002 | Ambrosina et al. | |
| 7,338,058 B2* | 3/2008 | Nicolai | B62M 11/145 |
| | | | 475/296 |
| 8,131,413 B2* | 3/2012 | Yuan | B62M 6/45 |
| | | | 310/156.01 |
| 8,657,047 B2 | 2/2014 | Urabe et al. | |
| 9,428,246 B2 | 8/2016 | Kitamura et al. | |
| 9,586,606 B2 | 3/2017 | Carter et al. | |
| 9,599,526 B2 | 3/2017 | Mercat et al. | |
| 10,220,899 B2* | 3/2019 | Yang | E05B 47/06 |
| 10,370,869 B2* | 8/2019 | Yang | G07C 9/00944 |
| 2005/0062254 A1* | 3/2005 | Nicolai | B62M 11/145 |
| | | | 280/260 |
| 2020/0324857 A1* | 10/2020 | Talavasek | B62M 6/90 |

FOREIGN PATENT DOCUMENTS

| | | |
|---|---|---|
| DE | 7043582 U | 5/1973 |
| DE | 10 2013 220 447 A | 4/2015 |
| WO | 2015/079742 A1 | 6/2015 |

* cited by examiner

*Primary Examiner* — Kevin Hurley
*Assistant Examiner* — Michael R Stabley
(74) *Attorney, Agent, or Firm* — Global IP Counselors, LLP (57) ABSTRACT

A bicycle part includes a housing and a lid. The housing includes an inner peripheral portion, an outer peripheral portion, an end wall portion and a connecting portion. The outer peripheral portion is spaced radially outward from the inner peripheral portion with respect to a center axis of the enclosed area. The end wall portion interconnects the inner peripheral portion and the outer peripheral portion to at least partly define an internal space. The connecting portion interconnects the inner peripheral portion and the outer peripheral portion. The lid overlies the internal space. The lid is welded to the inner peripheral portion along an inner weld path and the outer peripheral portion along an outer weld path. The lid is further welded to at least part of the connecting portion of the housing a connecting weld path connecting the inner weld path and the outer weld path.

12 Claims, 10 Drawing Sheets

BICYCLE PART AND METHOD OF FORMING BICYCLE PART

BACKGROUND

Technical Field

This disclosure generally relates to a bicycle part and a method of forming a bicycle part.

Background Information

Generally, a bicycle part typically have many pieces that need to be combined together as a unit. In some instances, the bicycle part includes a housing and a lid or cover for housing other pieces of the bicycle part. For example, U.S. Pat. No. 6,418,797 (assigned to Shimano Inc.) discloses a bicycle hub that has an electronic unit that has a housing and a cover for housing a printed circuit board. Typically, the cover is attached to the housing by a plurality of screws.

SUMMARY

Generally, the present disclosure is directed to various features of a bicycle part for a bicycle. One object of the present disclosure is to weld a lid to a housing with a continuous weld.

In view of the state of the known technology and in accordance with a first aspect of the present disclosure, a bicycle part is provided that basically comprises housing and a lid. The housing includes an inner peripheral portion, an outer peripheral portion, an end wall portion and a connecting portion. The inner peripheral portion at least partially defines an enclosed area. The outer peripheral portion is spaced radially outward from the inner peripheral portion with respect to a center axis of the enclosed area. The end wall portion interconnects the inner peripheral portion and the outer peripheral portion to at least partly define an internal space. The connecting portion interconnects the inner peripheral portion and the outer peripheral portion. The lid overlies the internal space of the housing. The lid is joined to the inner peripheral portion of the housing by welding along an inner weld path. The lid is joined to the outer peripheral portion of the housing by welding along an outer weld path. The lid is joined to at least part of the connecting portion of the housing by welding along a connecting weld path connecting the inner weld path and the outer weld path.

With the bicycle part according to the first aspect, an improved weld can be formed between the housing and the lid to avoid deformation of the lid due to the welding process.

In accordance with a second aspect of the present disclosure, the bicycle part according to the first aspect is configured so that the inner weld path includes a partly circular portion, and the outer weld path includes a partly circular portion.

With the bicycle part according to the second aspect, it is possible to easily form an inner weld and an outer weld between the housing and the lid.

In accordance with a third aspect of the present disclosure, the bicycle part according to the second aspect is configured so that the partly inner circular portion and the partly outer circular portion are concentrically arranged.

With the bicycle part according to the third aspect, the inner peripheral portion and the outer peripheral portion can be concentrically arranged so that the bicycle part can be rotated.

In accordance with a fourth aspect of the present disclosure, the bicycle part according to any one the first to third aspects is configured so that the connecting weld path includes a first connecting weld portion and a second connecting weld portion that connect the inner weld path and the outer weld path.

With the bicycle part according to the fourth aspect, it is possible to easily form the weld path.

In accordance with a fifth aspect of the present disclosure, the bicycle part according to any one the first to fourth aspects is configured so that the inner weld path, the outer weld path, and the connecting weld path form a continuous weld path.

With the bicycle part according to the fifth aspect, it is possible to weld the lid to the housing without stopping the laser beam.

In accordance with a sixth aspect of the present disclosure, the bicycle part according to the fifth aspect is configured so that the continuous weld path is a closed loop.

With the bicycle part according to the sixth aspect, it is possible to securely join the lid to the housing.

In accordance with a seventh aspect of the present disclosure, the bicycle part according to any one the first to sixth aspects further comprises an electronic circuit board provided in the internal space of the housing.

With the bicycle part according to the seventh aspect, it is possible to protect the electronic circuit board more reliably.

In accordance with an eighth aspect of the present disclosure, the bicycle part according to the seventh aspect further comprises an electric power storage provided in the internal space of the housing at a position other than on the electronic circuit board.

With the bicycle part according to the eighth aspect, it is possible to secure a large space for arranging the electric power storage and to miniaturize the electronic unit.

In accordance with a ninth aspect of the present disclosure, the bicycle part according to any one the first to eighth aspects is configured so that the enclosed area is an opening.

With the bicycle part according to the ninth aspect, it is possible to increase the degree of freedom in arranging parts in the opening and facilitate compact storage of the electronic unit. The parts can be a shaft or an axle configured to support the bicycle part.

In accordance with a tenth aspect of the present disclosure, the bicycle part according to any one the first to ninth aspects further comprises a hub axle, a hub body and an electric power generator. The hub axle supports the housing. The hub body is rotatably disposed around the center axis. The electric power generator is disposed in the hub body, and configured to generate electric power by rotation of the hub body.

With the bicycle part according to the tenth aspect, it is possible to store the electrical unit in the hub equipped with the electric power generator.

In accordance with an eleventh aspect of the present disclosure, the bicycle part according to the tenth aspect is configured so that the housing is non-rotatably with respect to the hub axle.

With the bicycle part according to the eleventh aspect, it is possible to avoid damage to the bicycle part, to minimize noise and to allow wiring to the electrical unit more reliably.

In accordance with a twelfth aspect of the present disclosure, the bicycle part according to the tenth or eleventh aspect further comprises a sprocket support structure rotatably disposed around the center axis to transmit a driving force to the hub body while rotating in a driving rotational direction around the center axis.

With the bicycle part according to the twelfth aspect, it is possible to store the electrical unit in a hub with a sprocket support structure.

In accordance with a thirteenth aspect of the present disclosure, the bicycle part according to any one the tenth to twelfth aspects further comprises a detected part and a rotation detection sensor. The detected part is provided to the sprocket support structure. The rotation detection sensor is provided in the internal space of the housing. The rotation detection sensor is configured to detect the detected part to detect rotation of the sprocket support structure around the center axis.

With the bicycle part according to the thirteenth aspect, it is possible to detect rotation of the sprocket support structure.

In accordance with a fourteenth aspect of the present disclosure, a bicycle part is provided that basically comprises a housing, an electronic circuit board and an electric power storage. The housing includes an inner peripheral portion, an outer peripheral portion and an end wall portion. The inner peripheral portion at least partially defines an enclosed area. The outer peripheral portion is spaced radially outward from the inner peripheral portion with respect to a center axis of the enclosed area. The end wall portion interconnects the inner peripheral portion and the outer peripheral portion to at least partly define an internal space. The electronic circuit board is provided in the internal space of the housing. The electronic circuit board includes at least one arc shaped edge corresponding to an arc shaped surface of one of the inner peripheral portion and the outer peripheral portion of the housing, the electronic circuit board includes at least one electrical component. The electric power storage is provided in the internal space of the housing at a position other than on the electronic circuit board, and electrically connected to the at least one electrical component.

With the bicycle part according to the fourteenth aspect, the bicycle part can be relatively compact with its own electric power for the at least one electrical component of the electronic circuit board, and does not need electric power from an external power source.

In accordance with a fifteenth aspect of the present disclosure, a bicycle part according to the fourteenth aspect is configured so that the at least one arc shaped edge includes at least one of an inner arc shaped edge that corresponding to an inner arc shaped surface of the inner peripheral portion and an outer arc shaped edge that corresponding to an outer arc shaped surface of the outer peripheral portion of the housing.

With the bicycle part according to the fifteenth aspect, the bicycle part can be arranged on a shaft or axle. The gap between the electronic board and the housing can be reduced to increase the area of the electrical board placed inside the housing.

In accordance with a sixteenth aspect of the present disclosure, the bicycle part according to the fourteenth or fifteenth aspect further comprises a lid overlying the internal space of the housing and coupled to the housing.

With the bicycle part according to the sixteenth aspect, the parts in the housing can be more reliably protected by providing a lid to the housing.

In accordance with a seventeenth aspect of the present disclosure, the bicycle part according to any one the fourteenth to sixteenth aspects is configured so that the electric power storage includes at least one capacitor.

With the bicycle part according to the seventeenth aspect, it is possible to inexpensively and in a small space store electric power in the bicycle part.

In accordance with an eighteenth aspect of the present disclosure, the bicycle part according to any one the fourteenth to seventeenth aspects is configured so that the enclosed area is an opening.

With the bicycle part according to the eighteenth aspect, the bicycle part can be supported on a shaft or an axle.

In accordance with a nineteenth aspect of the present disclosure, the bicycle part according to any one the fourteenth to eighteenth aspects further comprises a hub axle, a hub body and an electric power generator. The hub axle supports the housing. The hub body is rotatably disposed around the center axis. The electric power generator is disposed in the hub body, and configured to generate electric power by rotation of the hub body.

With the bicycle part according to the nineteenth aspect, the bicycle part can be a bicycle hub that generates electric power.

In accordance with a twentieth aspect of the present disclosure, the bicycle part according to the nineteenth aspect is configured so that the housing is non-rotatably with respect to the hub axle.

With the bicycle part according to the twentieth aspect, it is possible to avoid damage to the bicycle part and to minimize noise by non-rotatably arranging the housing with respect to the hub axle.

In accordance with a twenty-first aspect of the present disclosure, the bicycle part according to the nineteenth or twentieth aspect further comprises a sprocket support structure rotatably disposed around the center axis to transmit a driving force to the hub body while rotating in a driving rotational direction around the center axis.

With the bicycle part according to the twenty-first aspect, the bicycle part can be a rear hub that is driven by a driving force.

In accordance with a twenty-second aspect of the present disclosure, the bicycle part according to any one the nineteenth to twenty-first aspects is configured so that the at least one electrical component includes a rotation detection sensor that is configured to detect a detected part to detect rotation of the sprocket support structure around the center axis.

With the bicycle part according to the twenty-second aspect, it is possible to reliable detect rotation of the sprocket support structure.

In accordance with a twenty-third aspect of the present disclosure, a method is performed to form a bicycle part having a housing and a lid joined to the housing. The method comprises overlying the lid on the housing; and welding the lid to the housing by forming a weld along an inner weld path corresponding to an inner peripheral portion of the housing, along an outer weld path corresponding to an outer peripheral portion of the housing, and along at least one connecting weld path corresponding to a connecting portion of the housing. The connecting weld path connects the inner weld path and the outer weld path.

With the method according to the twenty-third aspect, it is possible to weld the lid to the housing while avoiding deformation of the lid due to the welding process.

In accordance with a twenty-fourth aspect of the present disclosure, the method according to the twenty-third aspect is performed so that the welding of the lid to the housing is performed using a laser beam.

With the method according to the twenty-fourth aspect, it is possible to weld the lid to the housing while avoiding deformation of the lid due to the welding process.

In accordance with a twenty-fifth aspect of the present disclosure, the method according to the twenty-third or twenty-fourth aspect is performed so that the welding of the lid to the housing is performed by a continuous weld path that includes the at least one connecting weld path, the inner weld path and the outer weld path.

With the method according to the twenty-fifth aspect, it is possible to weld the lid to the housing without stopping the laser beam.

In accordance with a twenty-sixth aspect of the present disclosure, the method according to the twenty-fifth aspect is performed so that the continuous weld path is a closed loop.

With the method according to the twenty-sixth aspect, it is possible to securely join the lid to the housing.

In accordance with a twenty-seventh aspect of the present disclosure, the method according to the twenty-fifth or twenty-sixth aspect is performed so that the at least one connecting weld path includes a first connecting weld portion and a second connecting weld portion that connect the inner weld path and the outer weld path.

With the method according to the twenty-seventh aspect, it is possible to easily perform the welding process in which an inner weld and an outer weld are formed between the housing and the lid without stopping the laser beam.

Also, other objects, features, aspects and advantages of the disclosed bicycle part will become apparent to those skilled in the art from the following detailed description, which, taken in conjunction with the annexed drawings, discloses preferred embodiments of the bicycle part.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
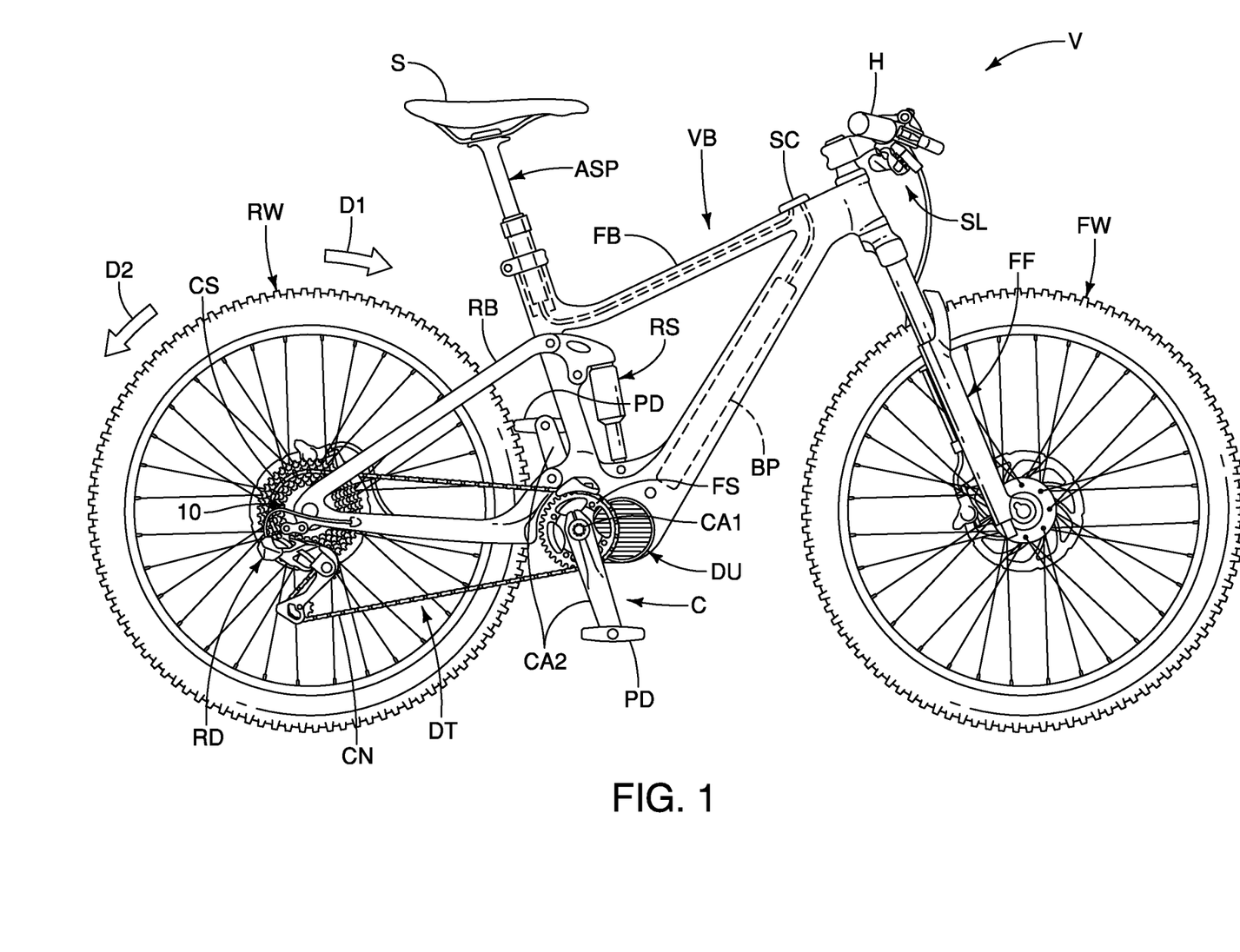
FIG. 1 is a side elevational view of a bicycle (i.e., a human-powered vehicle) equipped with a bicycle part in the form of a hub in accordance with a first embodiment.

Referring initially to FIG. 1, a bicycle V (i.e., a human-powered vehicle) is illustrated that is equipped with a bicycle part 10 in accordance with an illustrated embodiment. Here, in the illustrated embodiment, the bicycle part 10 is a bicycle hub. More specifically, the bicycle part 10 is a bicycle rear hub. Also, here, in the illustrated embodiment, the bicycle part 10 is a hub dynamo for providing electric power to one or more components of the bicycle V. However, the bicycle part 10 is not limited to a hub dynamo. In particular, certain aspects of the hub bicycle part can be provided to a bicycle part that does not generate electric power. Also, while the bicycle part 10 is illustrated as a rear hub, certain aspects of the bicycle part 10 can be provided to a front hub. Thus, the bicycle part 10 is not limited to a rear hub.

Here, the bicycle V is an electric assist bicycle (E-bike). Alternatively, the bicycle V can be a road bicycle, a city bike, a cargo bike, and a recumbent bike, or another type of off-road bicycle such as a cyclocross bicycle. As seen in FIG. 1, the bicycle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column or a steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The bicycle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CAL A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the bicycle V in a conventional manner. The electric drive unit DU is actuated, for example, in accordance with a human driving force applied to the pedals PD. The electric drive unit DU is actuated by electric power supplied from a main battery pack BP that is mounted on a downtube of the bicycle V. The main battery pack BP can provide electrical power to other vehicle components such as the rear derailleur RD, the height adjustable seatpost ASP, the rear shock absorber RS, the front fork FF and any other vehicle component that uses electrical power.

The bicycle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the bicycle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the bicycle V.

Here, the bicycle V further includes a rear derailleur RD that is attached to the rear frame body RB for shifting the chain CN between the rear sprockets CS. The rear derailleur RD is one type of gear changing device. Here, the rear derailleur RD is an electric derailleur (i.e., an electric gear changing device or an electric transmission device). Here, the rear derailleur RD is provided on the rear side of the rear frame body RB near the bicycle part 10. The rear derailleur RD can be operated when a rider of the bicycle V manually operates a gear shift operating device or shifter SL. The rear derailleur RD can also be automatically operated based on traveling conditions and or operating conditions of the bicycle V. The bicycle V can further include a plurality of electronic components. Some or all of the electronic components can be supplied with electric power generated by the bicycle part 10 during a power generation state as discussed herein.

The structure of the bicycle part 10 will now be described with particular reference to FIGS. 2 to 4. Here, the bicycle part 10 comprises a hub axle 12 and a hub body 14. The hub axle 12 has a center axis A1. The hub axle 12 is configured to be non-rotatably attached to the vehicle body VB. In this embodiment, the hub axle 12 is configured to be non-rotatably attached to the rear frame body RB. The hub body 14 is rotatably disposed around the center axis A1. The hub body 14 is rotatably disposed around the center axis A1. In other words, the hub body 14 is rotatably mounted around the hub axle 12.

Figure 2:
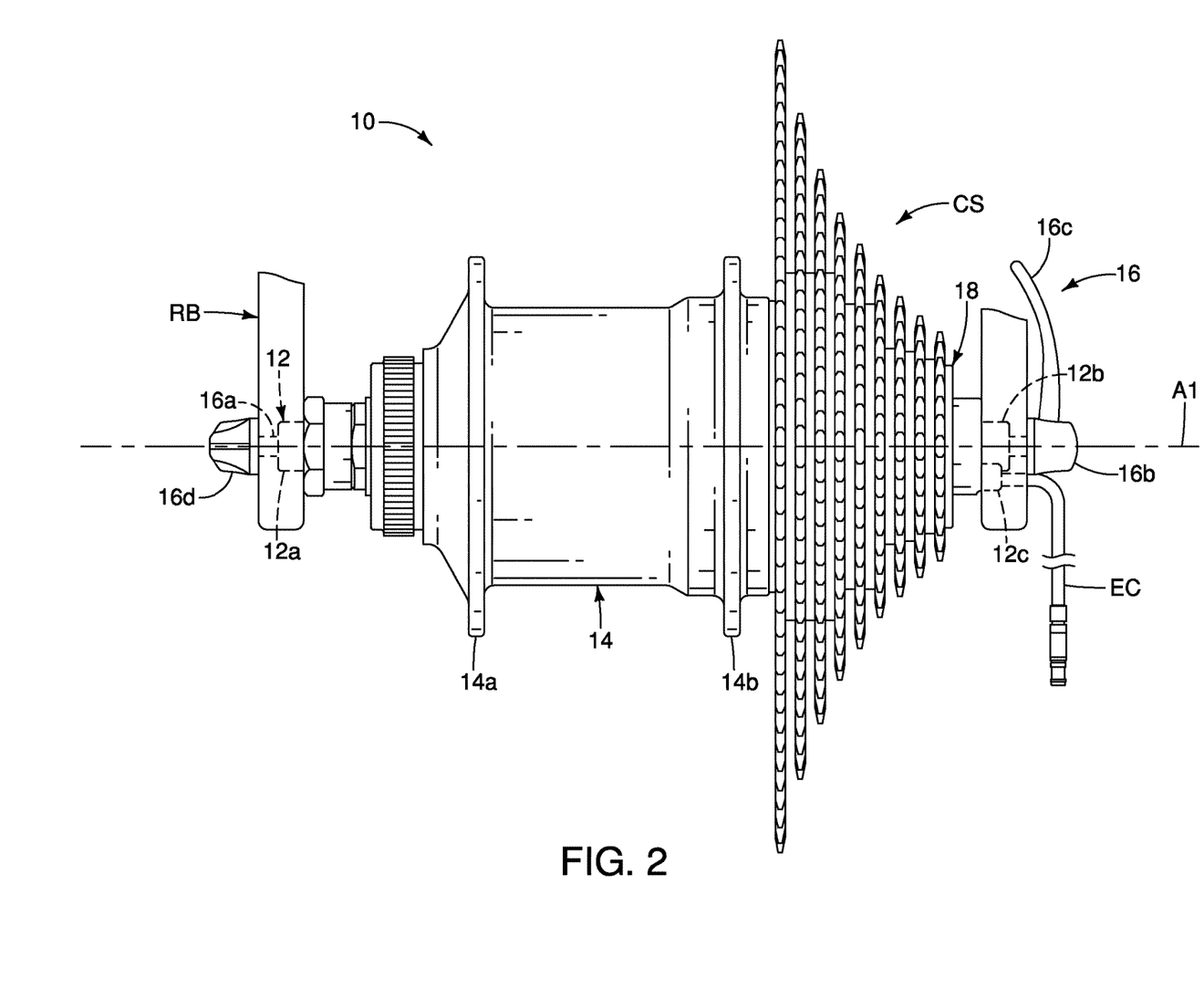
FIG. 2 is a longitudinal elevational view of the hub attached to the vehicle body of the human-powered vehicle illustrated in FIG. 1.
Figure 3:
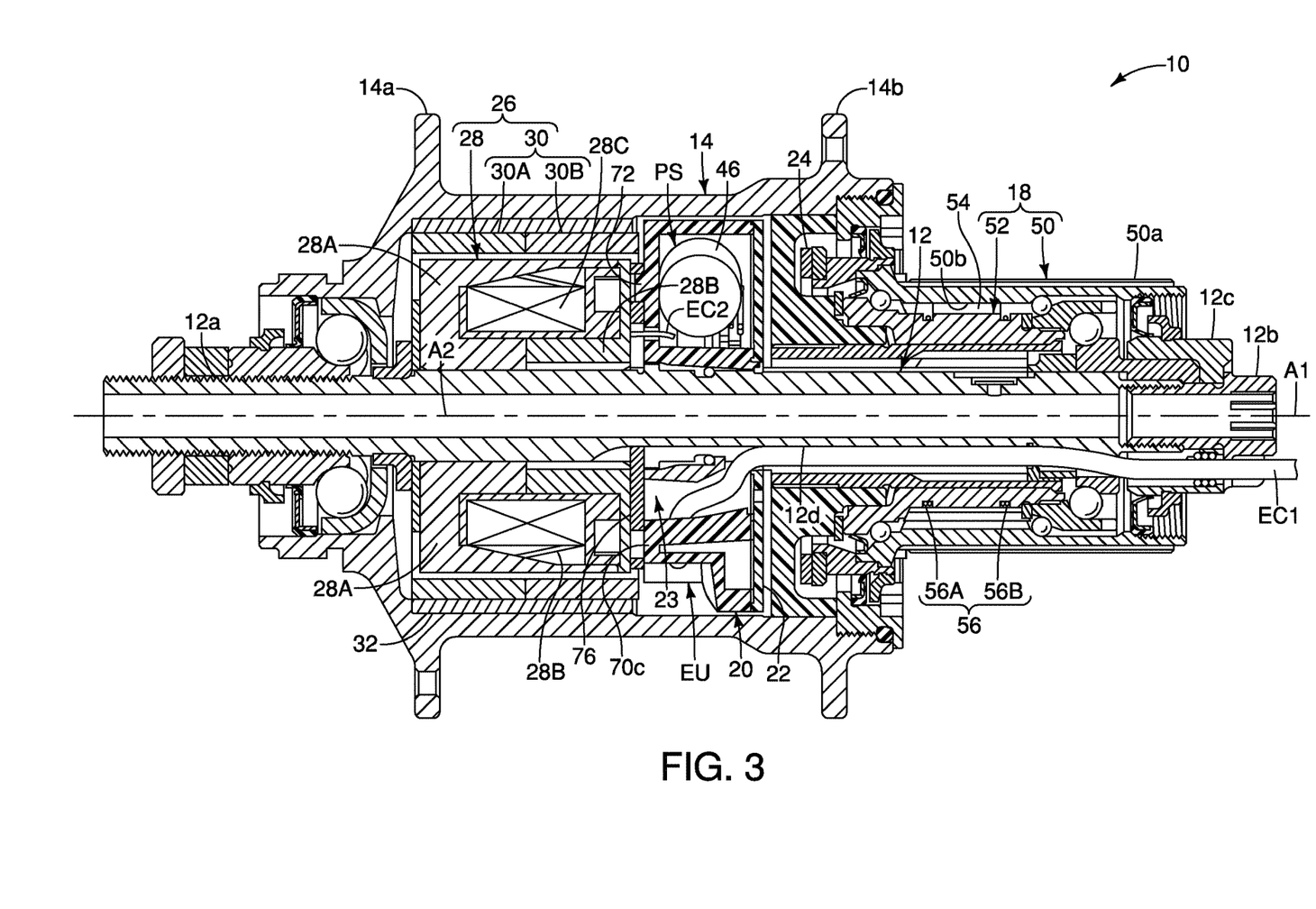
FIG. 3 is a longitudinal cross-sectional view of the hub illustrated in FIG. 2.
Figure 4:
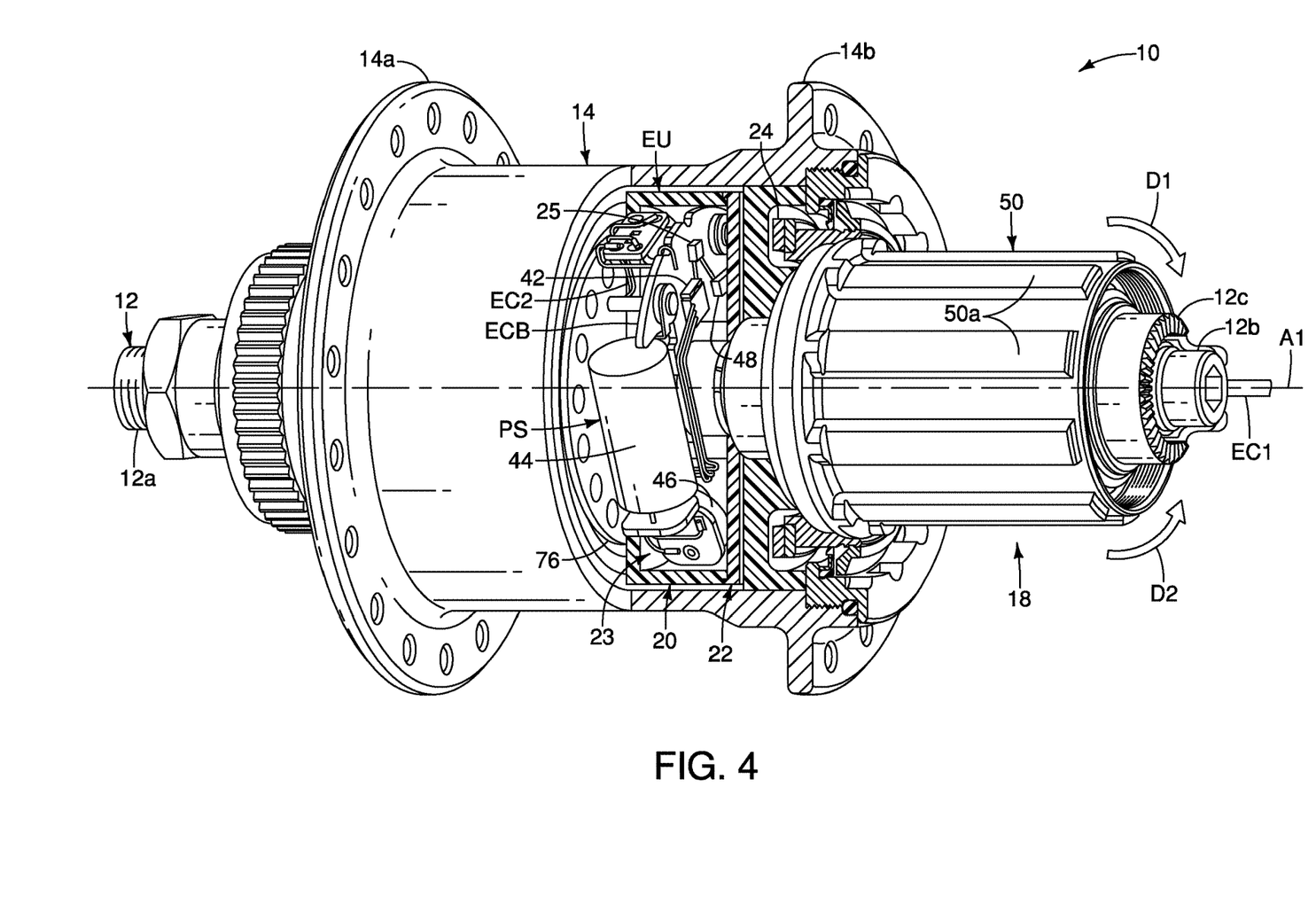
FIG. 4 is a perspective view of the hub illustrated in FIGS. 2 to 4 with portions broken way to show an electrical unit having a rotation detection sensor and a magnet provided to a sprocket support structure for detecting rotation of the sprocket support structure.
Figure 5:
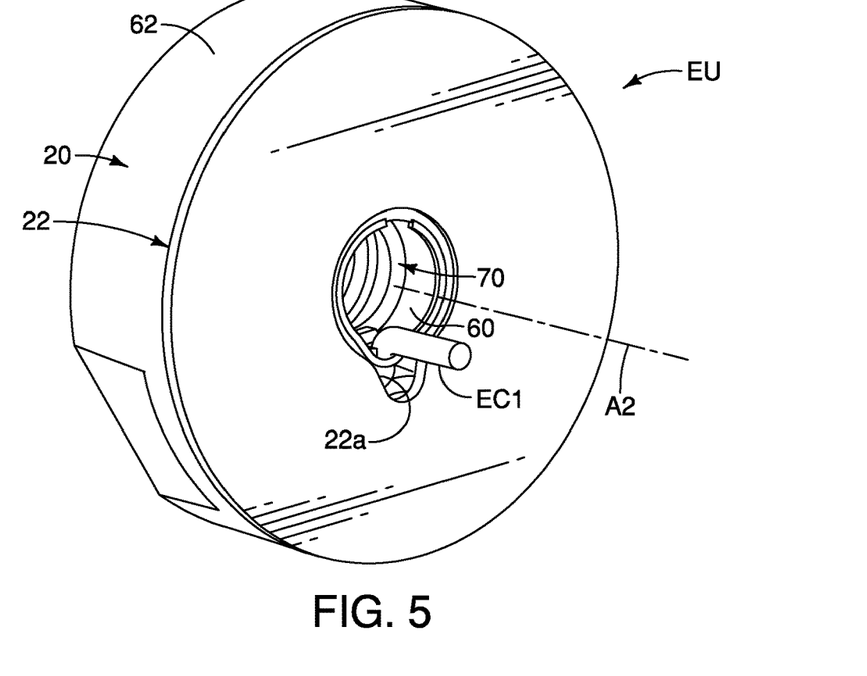
FIG. 5 is a first side perspective view of the electrical unit of the hub illustrated in FIGS. 2 to 4.
Figure 6:
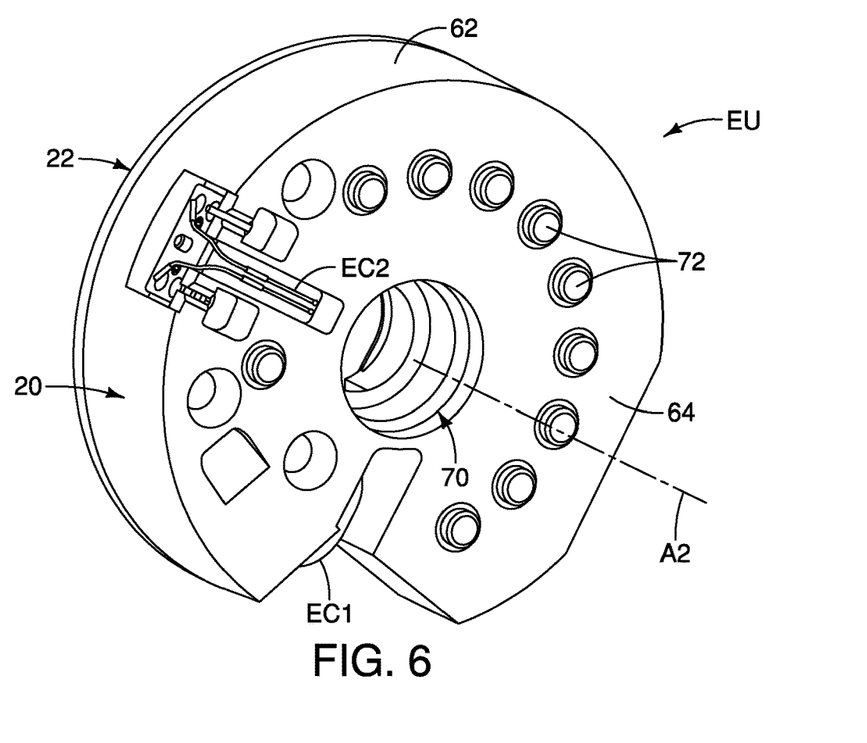
FIG. 6 is a first side perspective view of the electrical unit illustrated in FIG. 5 of the hub illustrated in FIGS. 2 to 4.
Figure 7:
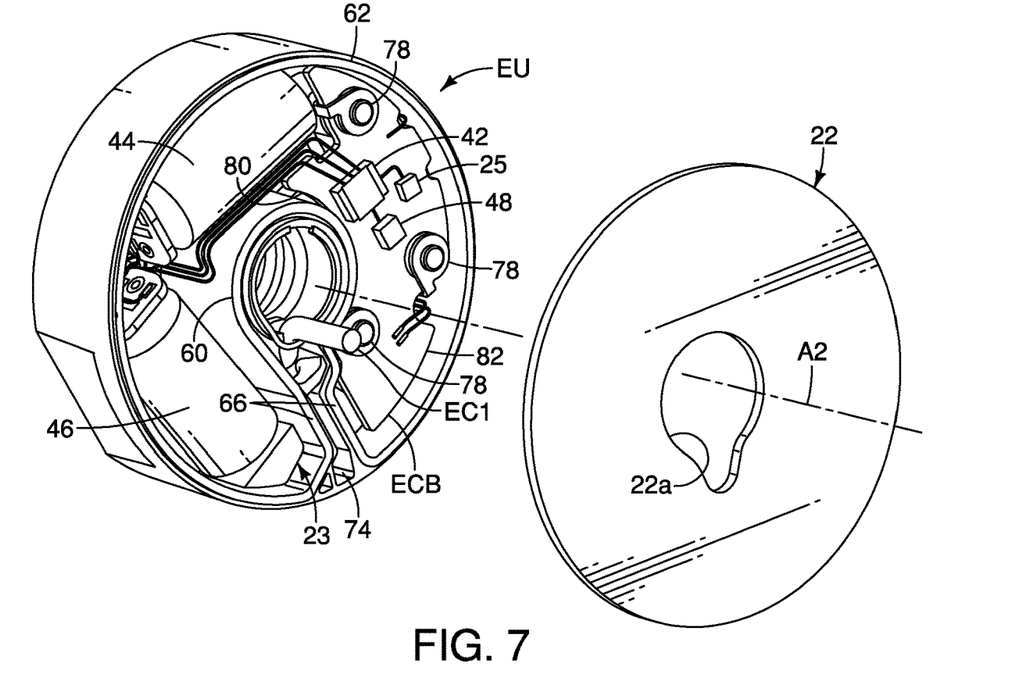
FIG. 7 is a partially exploded perspective view of the electrical unit illustrated in FIGS. 5 and 6.
Figure 8:
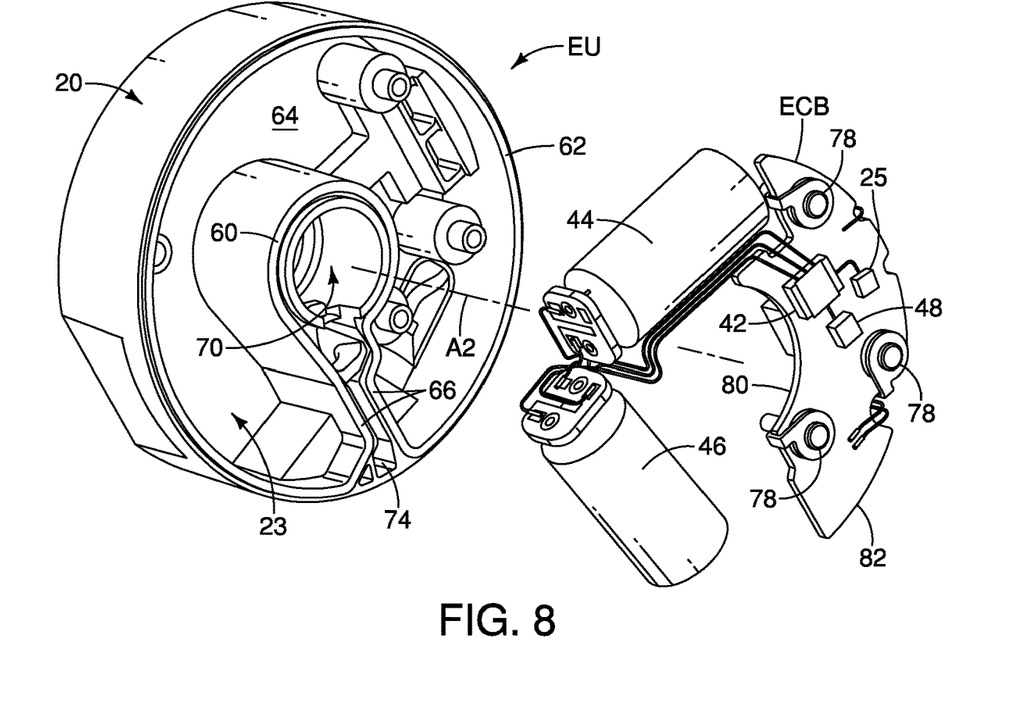
FIG. 8 is a partially exploded perspective view of the electrical unit illustrated in FIGS. 5 to 7.
Figure 9:
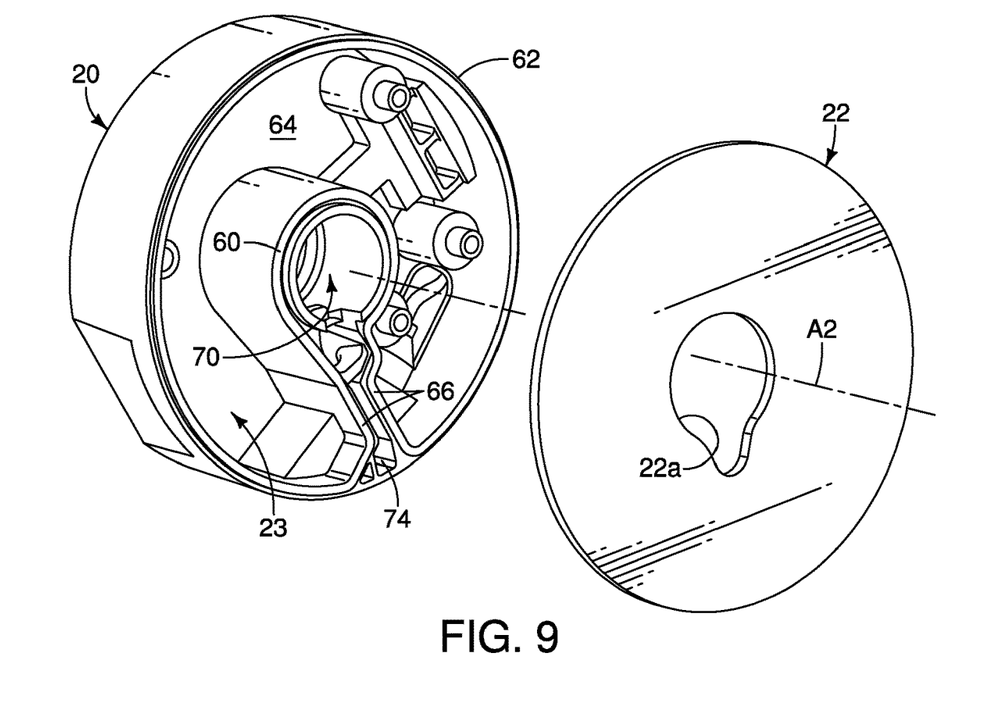
FIG. 9 is an exploded perspective view of the housing and the lid of the electrical unit illustrated in FIGS. 5 to 8.

As seen in FIGS. 2 to 4, the hub axle 12 is a rigid member made of a suitable material such as a metallic material. Here, the hub axle 12 is a tubular member. The hub axle 12 can be a one-piece member or made of several pieces. Here, the hub axle 12 includes a main body 12a and an end piece 12b. The end piece 12b is threadedly mounted to a first end (right side in FIGS. 2 to 4) of the main body 12a. In this way, the second end (left side in FIGS. 2 to 4) of the main body 12a and the end piece 12b are received in mounting openings of the rear frame body RB as seen in FIG. 2. Here, the hub axle 12 further includes a rotation restriction member 12c which is coupled to the main body 12a by the end piece 12b. The rotation restriction member 12c engages the rear frame body RB so that rotation of the hub axle 12 relative to the rear frame body RB is restricted.

Here, as seen in FIG. 2, the bicycle part 10 further comprises a wheel holding mechanism 16 for securing the hub axle 12 of the bicycle part 10 to the rear frame body RB. The wheel holding mechanism 16 basically includes a shaft or skewer 16a, a cam body 16b, a cam lever 16c and an adjusting nut 16d. The cam lever 16c is attached to one end of the skewer 16a via the cam body 16b, while the adjusting nut 16d is threaded on the other end of the skewer 16a. The lever 16c is attached to the cam body 16b. The cam body 16b is coupled between the skewer 16a and the cam lever 16c to move the skewer 16a relative to the cam body 16b. Thus, the lever 16c is operated to move the skewer 16a in the axial direction of the center axis A1 with respect to the cam body 16b to change the distance between the cam body 16b and the adjusting nut 16d. Preferably, a compression spring is provided at each end of the skewer 16a. Alternatively, the hub axle 12 can be non-rotatably attached to the rear frame body RB with other attachment structures as needed and/or desired.

As indicated in FIGS. 1 and 4, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the center axis A1. The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together.

Here, the bicycle part 10 further comprises a sprocket support structure 18. In the illustrated embodiment, the sprocket support structure 18 supports the rear sprockets CS as seen in FIG. 2. The sprocket support structure 18 is rotatably disposed around the center axis A1 to transmit a driving force to the hub body 14 while rotating in a driving rotational direction D1 around the center axis A1. As explained below, the sprocket support structure 18 does not transmit a driving force to the hub body 14 while rotating in a non-driving rotational direction D2 around the center axis A1. The non-driving rotational direction D2 is opposite to the driving rotational direction D1 with respect to the center axis A1. The center rotational axis of the sprocket support structure 18 is disposed concentrically with the center axis A1 of the hub axle 12.

While the sprocket support structure 18 is configured to non-rotatably support the rear sprockets CS, the sprocket support structure 18 is not limited to the illustrated embodiment. Alternatively, one or more of the rear sprockets CS can be integrally formed with the sprocket support structure 18. In any case, the sprocket support structure 18 and the rear sprockets CS are coupled together to rotate together in both the driving rotational direction D1 and the non-driving rotational direction D2.

As seen in FIGS. 3 and 4, the bicycle part 10 comprises a housing 20. The housing 20 is configured to house various electrical components. The housing 20 defines an internal space 23 that has a donut shape. In the illustrated embodiment, the bicycle part 10 comprises an electronic circuit board ECB and an electric power storage PS. The electronic circuit board ECB is provided in the internal space 23 of the housing 20. The electric power storage PS is provided in the internal space 23 of the housing 20 at a position other than on the electronic circuit board ECB. The electronic circuit board ECB is electrically connected to the electric power storage PS for controlling the input and output of electric power from the electric power storage PS. A first electrical cable EC1 is electrically connected at one end to the electronic circuit board ECB. The other end of the first electrical cable EC1 is electrically connected to another electrical component of the bicycle V such as the rear derailleur RD, the battery pack BP or an electrical junction. In this way, the first electrical cable EC1 can provide electric power generated by the bicycle part 10 to the rear derailleur RD, the battery pack BP or another electrical component. The first electrical cable EC1 can also be used to transmit signals using power line communication (PLC).

The hub axle 12 supports the housing 20. Here, the housing 20 is non-rotatably with respect to the hub axle 12. The bicycle part 10 further comprises a lid 22. The lid 22 is coupled to the housing 20 by welding as explained below. Preferably, the housing 20 and the lid 22 are rigid members made from a suitable material. For example, the housing 20 and the lid 22 are made of a resin material. For example, the housing 20 and the lid 22 can each be injected molded members. The lid 22 overlying an internal space 23 of the housing 20 and coupled to the housing 20.

The electronic circuit board ECB includes at least one electrical component. Thus, at least the housing 20, the lid 22 and the electronic circuit board ECB defines an electrical unit EU that is disposed in the hub body 14. The electric power storage PS is electrically connected to the at least one electrical component. In the illustrated embodiment, the bicycle part 10 further comprises a detected part 24 and a rotation detection sensor 25. The detected part 24 is provided to the sprocket support structure 18. On the other hand, the rotation detection sensor 25 is provided in the internal space 23 of the housing 20. The rotation detection sensor 25 is configured to detect the detected part 24 to detect rotation of the sprocket support structure 18 around the center axis A1. In other words, the at least one electrical component includes the rotation detection sensor 25 that is configured to detect the detected part 24 to detect rotation of the sprocket support structure 18 around the center axis A1. Since the rotation detection sensor 25 is on the electronic circuit board ECB, the rotation detection sensor 25 are non-rotatable with respect to the hub axle 12. As seen in FIG. 4, the rotation detection sensor 25 is disposed in the hub body 14 at a location spaced radially outward from the hub axle 12.

In the illustrated embodiment, the rotation detection sensor 25 includes a magnetic sensor, and the detected part 24 includes a magnet. Thus, the magnetic sensor detects movement of the magnet, which rotates together with the sprocket support structure 18. In other words, with this arrangement, the rotation detection sensor 25 is configured to detect the detected part 24 to detect rotation of the sprocket support structure 18 around the center axis A1. Here, the magnet of the detected part 24 is an annular member with alternating S-pole sections and N-pole sections. In this way, the rotation detection sensor 25 can detect a rotational amount and a rotational direction of the sprocket support structure 18. The term "sensor" as used herein refers to a hardware device or instrument designed to detect the presence or absence of a particular event, object, substance, or a change in its environment, and to emit a signal in response. The term "sensor" as used herein do not include a human. The rotation detection sensor 25 receives electric power from the electric power storage PS.

As seen in FIG. 3, the bicycle part 10 further comprises an electric power generator 26. The electric power generator 26 is disposed in the hub body 14, and configured to generate electric power by rotation of the hub body 14. More specifically, the electric power generator 26 is disposed in the hub body 14 between the hub axle 12 and a center potion of the hub body 14. The electric power generator 26 is configured to generate electric power by rotation of the hub body 14 relative to the hub axle 12. The electronic circuit board ECB is electrically connected to the electric power generator 26 for controlling the electric power output of the electric power generator 26. In particular, a second electrical cable EC2 is electrically connects the electronic circuit board ECB to the electric power generator 26.

The electric power generator 26 basically includes an armature 28 (i.e., a stator in the illustrated embodiment) and a magnet 30 (i.e., a rotor in the illustrated embodiment). While the armature 28 is illustrated as being fixed with respect to the hub axle 12 and the magnet 30 is illustrated as being fixed with respect to the hub body 14, the armature 28 can be fixed with respect to the hub body 14 and the magnet 30 can be fixed with respect to the hub axle 12. The armature 28 includes a first yoke 28A, a second yoke 28B and a coil 28C. The first yoke 28A includes two or more first yoke pieces that are arranged in the circumferential direction of the hub axle 12. Likewise, the second yoke 28B includes two or more second yoke pieces that are arranged in the circumferential direction of the hub axle 12 and that alternate with the first yoke pieces of the first yoke 28A. The coil 28C is located between the first yoke 28A and the second yoke 28B. The magnet 30 includes a plurality of first magnet parts 30A and a plurality of second magnet parts 30B arranged inside a tubular support 32. The tubular support 32 fixedly coupled to the inside of the hub body 14 so that the magnet 30 and the hub body 14 rotate together around the hub axle 12. The first magnet parts 30A and the second magnet parts 30B are arranged so that S-poles and N-poles of the first magnet parts 30A and the second magnet parts 30B are alternately arranged in the circumferential direction of the hub axle 12. Therefore, the S-poles of the first magnet parts 30A are not aligned with the S-poles of the second magnet parts 30B, and the N-poles of the first magnet parts 30A are not aligned with the N-poles of the second magnet parts 30B in the axial direction of the shaft member 12.

The electronic circuit board ECB further includes an electronic controller 42 that provided on the electronic circuit board ECB. The electronic controller 42 is configured to receive a detection signal from the rotation detection sensor 25. The electronic controller 42 includes at least one processor that executes predetermined control programs. The at least one processor can be, for example, a central processing unit (CPU) or a micro processing unit (MPU). The term "electronic controller" as used herein refers to hardware that executes a software program, and does not include a human. The electronic controller 42 receives electric power from the electric power generator 26. The electronic controller 42 is configured to control the electric power generated by the electric power generator 26.

The electric power storage PS is retained in the internal space 23 of the housing 20 at a position other than on the electronic circuit board ECB. Here, the electric power storage PS is directly attached to the housing 20 by an adhesive or the like. Preferably, the electric power storage PS includes at least one capacitor. Here, the electric power storage PS includes a first capacitor 44 and a second capacitor 46. The electronic controller 42 is configured to control the storage of the electric power generated by the electric power generator 26 in the first capacitor 44 and the second capacitor 46. The electronic controller 42 is configured to control the distribution of the electric power stored in the first capacitor 44 and the second capacitor 46 to other components. Thus, the electric power generated by the electric power generator 26 can be stored and/or supplied directly to other components such as the rotation detection sensor 25, the rear derailleur RD, etc.

Preferably, as seen in FIG. 4, the electronic circuit board ECB further includes a data storage device 48 that provided on the electronic circuit board ECB. The data storage device 48 stores various control programs and information used for various control processes including power generation control, power storage control, hub rotation detection control, etc. The data storage device 48 includes any computer storage device or any non-transitory computer-readable medium with the sole exception of a transitory, propagating signal. For example, the data storage device 48 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Referring back to FIG. 3, the sprocket support structure 18 will be briefly discussed. The sprocket support structure 18 basically includes an outer body 50 and an inner body 52. The outer body 50 and the inner body 52 are tubular members that are coaxially arranged about the hub axle 12. The outer body 50 is configured to support at least one sprocket CS. Here, the outer body 50 has a plurality axially extending splines 50a provided on its outer peripheral surface for non-rotatably supporting the sprocket CS. The outer body 50 has also has a plurality of axially extending ratchet teeth 50b provided on its inner peripheral surface, forming a first part of a one-way clutch. As explained below, the inner body 52 is coupled to the hub body 14 to rotate therewith.

The sprocket support structure 18 further includes a plurality of pawls 54 and a biasing element 56. The plurality of pawls 54 and the biasing element 56 forms a second part of a one-way clutch. The pawls 54 are retained to the inner body 52 by the biasing element 56 such that the pawls 54 are biased towards engagement with the ratchet teeth 50b of the sprocket support structure 18. More specifically, here, the biasing element 56 includes a pair of split rings 56A and 56B in which the end portions of each split rings 56A and 56B overlap. The biasing element 56 is installed around the inner body 52 with portions of the pawls 54 disposed between the biasing element 56 and the inner body 52. The biasing element 56 squeezes the pawls 54 against the inner body 52 such that the pawls 54 pivot towards engagement with the ratchet teeth 50b of the sprocket support structure 18. In this way, the outer body 50 is coupled to the inner body 52 to rotate together in the driving rotational direction D1 around the center axis A1. Also, when the outer body 50 is rotated in the non-driving rotational direction D2, the ratchet teeth 50b of the sprocket support structure 18 push the pawls 54 and pivot the pawls 54 to a retracted position against the inner body 52. Thus, the outer body 50 is configured to rotate relative to the inner body 52 in the non-driving rotational direction D2 around the center axis A1. In this way, the outer body 50, the inner body 52, the pawls 54 and the biasing element 56 form a freewheel that is commonly used in bicycles. Since the basic operation of the freewheel is relatively conventional, the freewheel will not be discussed or illustrated in further detail.

Referring now to FIGS. 5 to 12, the electrical unit EU will now be discussed in more detail. As mentioned above, the electrical unit EU comprises the housing 20, the lid 22 and the various components (e.g., the electronic circuit board ECB and the electric power storage PS) that are disposed in the housing 20. The lid 22 is attached (i.e., welded) to the housing 20 to close the internal space 23 of the housing 20. Thus, the lid 22 overlies the internal space 23 of the housing 20. Preferably, the housing 20 and a lid 22 are preferably made of a non-metallic material such as a resin material.

The housing 20 includes an inner peripheral portion 60, an outer peripheral portion 62, an end wall portion 64 and a connecting portion 66. The end wall portion 64 interconnects the inner peripheral portion 60 and the outer peripheral portion 62 to at least partly define the internal space 23. The connecting portion 66 interconnects the inner peripheral portion 60 and the outer peripheral portion 62. The inner peripheral portion 60 at least partially defines an enclosed area 70. The outer peripheral portion 62 is spaced radially outward from the inner peripheral portion 60 with respect to a center axis A2 of the enclosed area 70. Here, the enclosed area 70 is an opening. The center axis A2 is coincident with the center axis A1 of the hub axle 12. The center axis A2 of the enclosed area 70 is defined as a center axis even if the enclosed area 70 is not circular opening. More specifically, in the illustrated embodiment, the inner peripheral portion 60 and the end wall portion 64 define a through opening for receiving the hub axle 12.

The inner peripheral portion 60, the outer peripheral portion 62 and the connecting portion 66 have the same height as measured from the end wall portion 64. In other words, the free ends of the inner peripheral portion 60, the outer peripheral portion 62 and the connecting portion 66 all at least partly lie in a single plane perpendicular to the center axis A2. In this way, the lid 22 can be attached to each of the inner peripheral portion 60, the outer peripheral portion 62 and the connecting portion 66.

Figure 10:
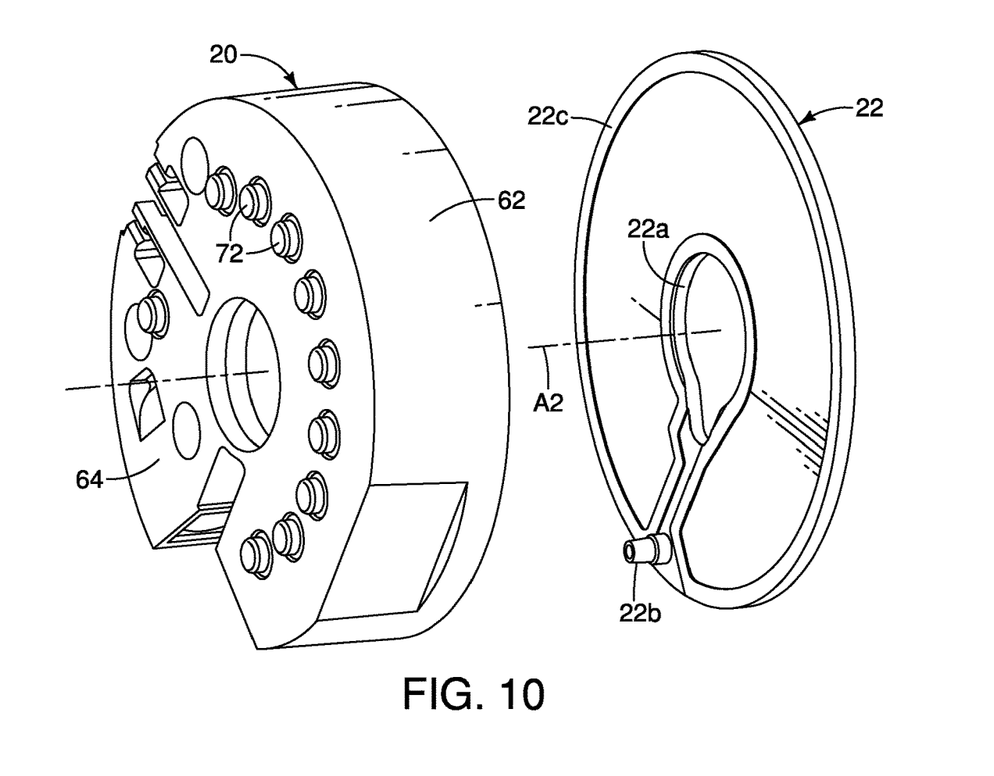
FIG. 10 is another exploded perspective view of the housing and the lid of the electrical unit illustrated in FIGS. 5 to 9.
Figure 11:
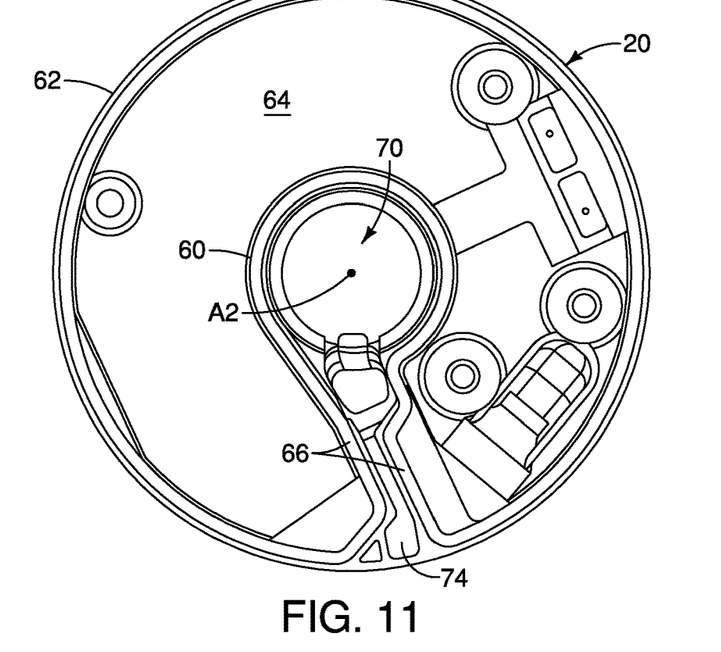
FIG. 11 is an elevational view of the housing of the electrical unit illustrated in FIGS. 5 to 10 viewing the internal space.
Figure 12:
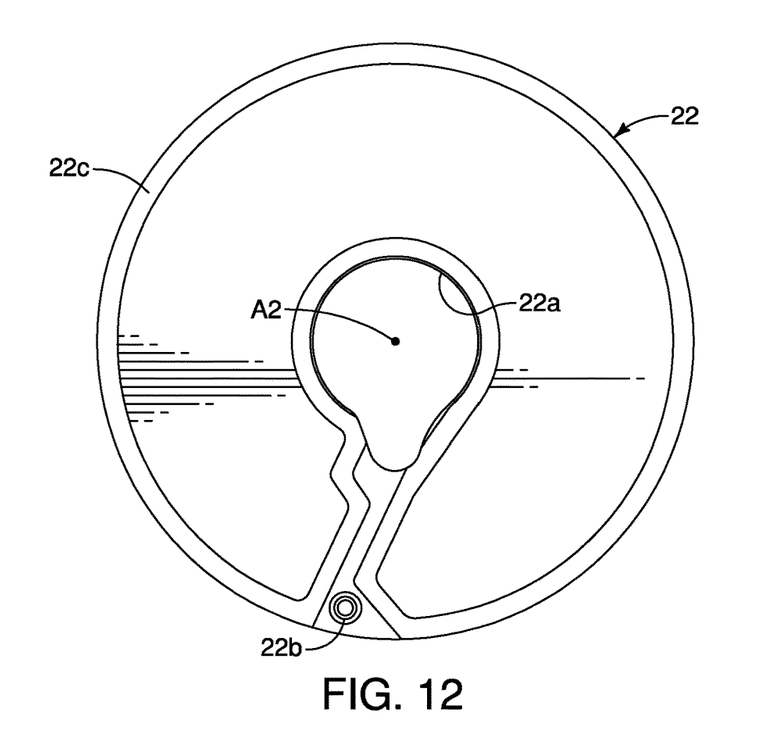
FIG. 12 is an elevational view of the lid of the electrical unit illustrated in FIGS. 5 to 10 viewing the inner side surface.

The lid 22 is a plate that has an opening 22a for receiving the hub axle 12. The lid 22 also has a locating pin 22b as seen in FIG. 10. The locating pin 22b is received in a recess 74 of the housing 20 for aligning the lid 22 with the housing 20 to aid in the attachment of the lid 22 to the housing 20. The lid 22 is also provided with a raised rib 22c that corresponds to where the lid 22 is welded to the housing 20. The raised rib 22c provides extra material so that the lid 22 does not warp during welding of the lid 22 to the housing 20. In addition, the raised ribs 22c are provided to improve the surface flatness of the welded portion.

The end wall portion 64 of the housing 20 includes a plurality of keying protrusions 72. The keying protrusions 72 are configured to engage openings in a fixing plate 76 that is keyed to the groove 12d of the hub axle 12 as seen in FIG. 2. In this way, the electrical unit EU is prevented from rotating relative to the hub axle 12. The fixing plate 76 has a plate shape.

The electronic circuit board ECB is attached to the housing 20 by a plurality of fasteners 78. Thus, the housing 20 supports the electronic circuit board ECB which in turn supports rotation detection sensor 38, the electronic controller 42 and the data storage device 48. The first capacitor 44 and the second capacitor 46 are supported to the end wall portion 64. For example, the first capacitor 44 and the second capacitor 46 are bonded to the end wall portion 64 by an adhesive cement.

The electronic circuit board ECB includes at least one arc shaped edge corresponding to an arc shaped surface of one of the inner peripheral portion 60 and the outer peripheral portion 62 of the housing 20. Here, the at least one arc shaped edge includes at least one of an inner arc shaped edge 80 that corresponding to an inner arc shaped surface of the inner peripheral portion 60 and an outer arc shaped edge 82 that corresponding to an outer arc shaped surface of the outer peripheral portion 62 of the housing 20.

Now, referring to FIGS. 13 to 17, a method of forming the bicycle part 10 having the housing 20 and the lid 22 joined to the housing 20 will now be discussed. More specially, the method of attaching or joining the housing 20 and the lid 22 together will now be discussed. Basically, in this method, the lid 22 is welded to the housing 20. For example, the welding of the lid 22 to the housing 20 is performed using a laser beam. In this method, the lid 22 is joined to the inner peripheral portion 60 of the housing 20 by welding along an inner weld path WP1, and the lid 22 is joined to the outer peripheral portion 62 of the housing 20 by welding along an outer weld path WP2. Also, preferably, in this method, the lid 22 is joined to at least part of the connecting portion 66 of the housing 20 by welding along a connecting weld path WP3 connecting the inner weld path WP1 and the outer weld path WP2. Here, in the illustrated embodiment, the connecting weld path WP3 includes a first connecting weld portion WP3a and a second connecting weld portion WP3b that connect the inner weld path WP1 and the outer weld path WP2.

Figure 13:
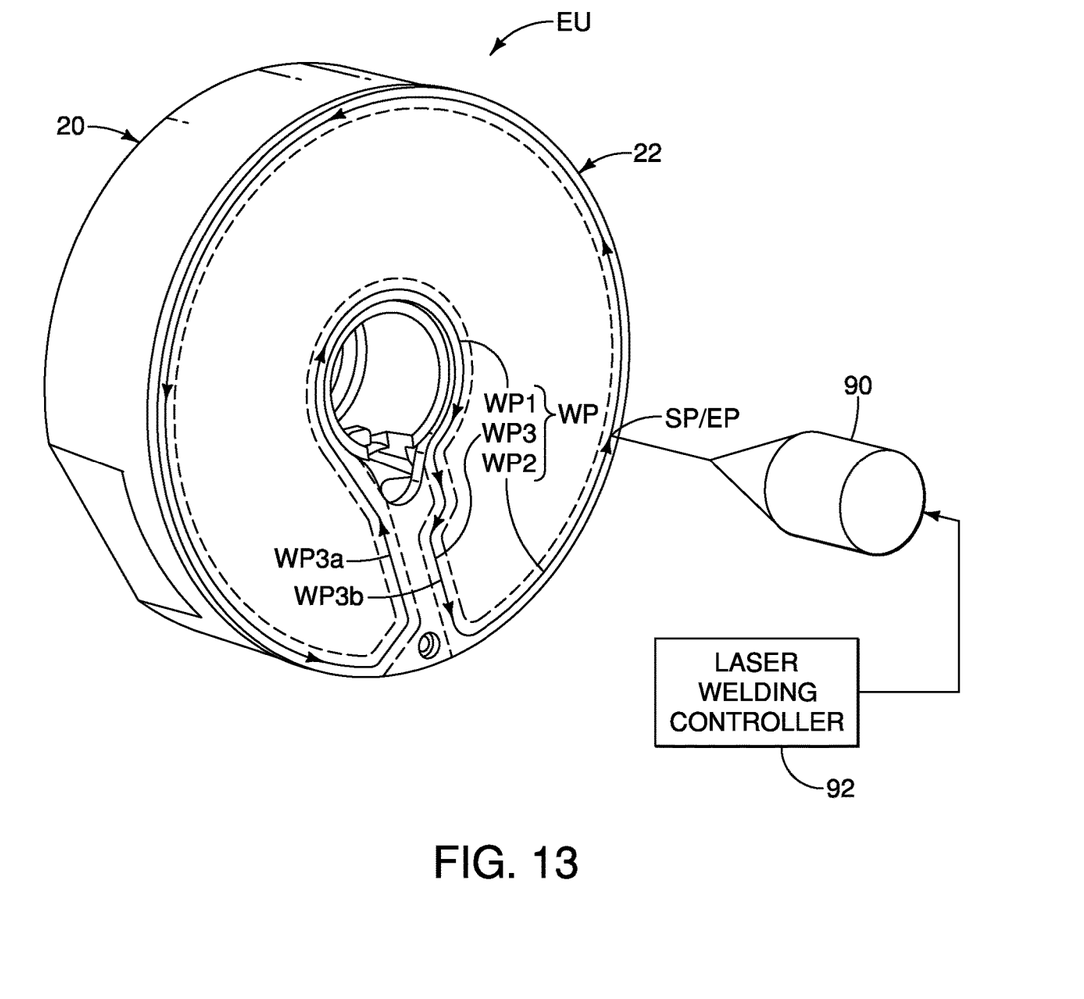
FIG. 13 is a diagrammatic perspective view of the lid being welded to the housing.

As seen in FIG. 13, the inner weld path WP1 includes a partly circular portion, and the outer weld path WP2 includes a partly circular portion. Here, the partly inner circular portion and the partly outer circular portion are concentrically arranged. Also, in the illustrated embodiment, the inner weld path WP1, the outer weld path WP2, and the connecting weld path WP3 form a continuous weld path WP. Preferably, the continuous weld path is a closed loop.

The method comprises overlying the lid 22 on the housing 20. The method further comprises welding the lid 22 to the housing 20 by forming a weld along the inner weld path WP1 corresponding to an inner peripheral portion 60 of the housing 20, along an outer weld path WP2 corresponding to an outer peripheral portion 62 of the housing 20, and along at least one connecting weld path WP3 corresponding to a connecting portion 66 of the housing 20. The connecting weld path WP3 connects the inner weld path WP1 and the outer weld path WP2. Preferably, the welding of the lid 22 to the housing 20 is performed by a continuous weld path WP that includes the at least one connecting weld path WP3, the inner weld path WP1 and the outer weld path WP2. Here, as mentioned above, the at least one connecting weld path WP3 includes the first connecting weld portion WP3a and a second connecting weld portion WP3b that connect the inner weld path WP1 and the outer weld path WP2.

Figure 14:
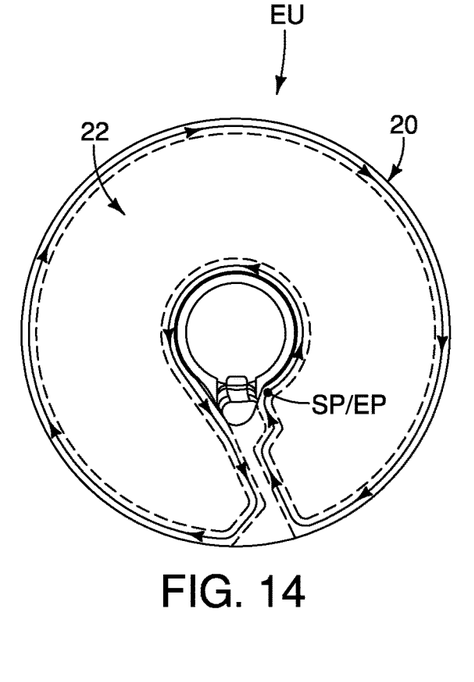
FIG. 14 is a side elevational view of the electrical unit in which a first alternate welding path is diagrammatically illustrated for welding the lid to the housing.
Figure 15:
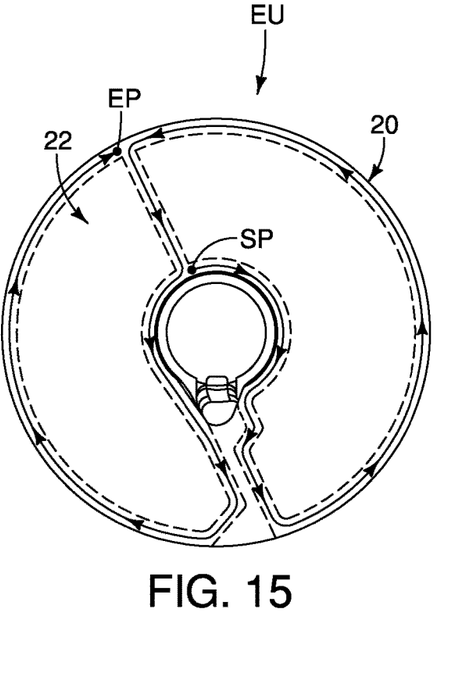
FIG. 15 is a side elevational view of the electrical unit in which a second alternate welding path is diagrammatically illustrated for welding the lid to the housing.
Figure 16:
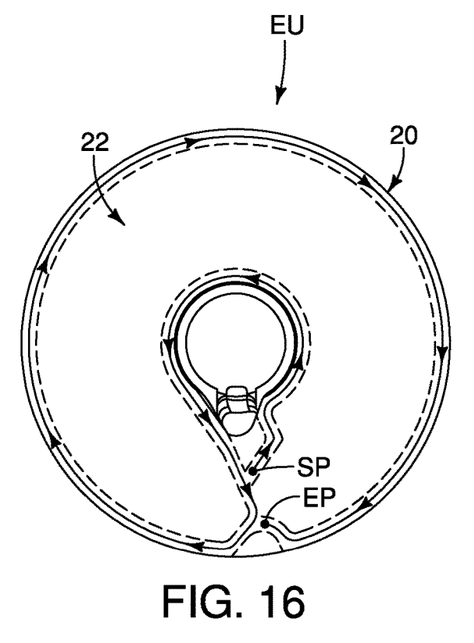
FIG. 16 is a side elevational view of the electrical unit in which a third alternate welding path is diagrammatically illustrated for welding the lid to the housing.
Figure 17:
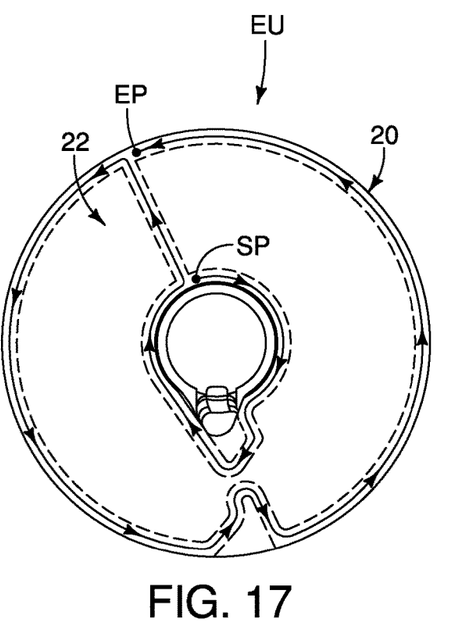
FIG. 17 is a side elevational view of the electrical unit in which a fourth alternate welding path is diagrammatically illustrated for welding the lid to the housing.

In one embodiment, the laser beam does not melt the lid 22, but penetrates the lid 22 and melts the housing 20. In another embodiment, the laser beam does not melt the housing 20, but melts the raised rib 22c of the lid 22. In another embodiment, both the laser beam melts both the housing 20 and the lid 22. In any case, the housing 20 and the lid 22 are joined by welding. Thus, a laser beam of a laser 90 is controlled by a laser welding controller 92 such that the laser beam is focused at an area to weld the lid 22 to the edge of the housing 22. Preferably, the laser 90 is controlled such that the continuous weld path WP is a closed loop. FIGS. 13 to 17 show various continuous weld paths WP where a starting point SP and an ending point EP results in a closed loop. The weld created by the laser 90 has a predetermined width such that the starting point SP and the ending point EP of the welding do not need to be the same point. In FIG. 14, the starting point SP and the ending point EP are the same point. In FIGS. 15, 16 and 17, the starting point SP and the ending point EP are the different points. The starting point SP and the ending point EP can be placed on nearby continuous weld path WP. As a result, the airtightness of the internal space 23 and the strength of the electronic unit EU are improved. During the laser welding process, the laser 90 will not be turned off. In other words, the laser beam of the laser 90 remains "on" and focused on the area between the lid 22 and the housing 22 with sufficient power to form a weld between the lid 22 and the housing 22. For example, the heights of the inner peripheral portion 60, the outer peripheral portion 62, and the connecting portion 66 can be partially changed. It is possible to prevent at least a part of the inner peripheral portion 60, the outer peripheral portion 62, and the connecting portion 66 from contacting with the lid 22. As a result, it is possible to form a region where the lid and the housing are not welded, if necessary, without turning off the laser 90.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle part. Accordingly, these directional terms, as utilized to describe the bicycle part should be interpreted relative to a bicycle in an upright riding position on a horizontal surface and that is equipped with the bicycle part. The terms "left" and "right" are used to indicate the "right"

when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle part comprising:
   a housing includes an inner peripheral portion at least partially defining an area, an outer peripheral portion spaced radially outward from the inner peripheral portion with respect to a center axis of the area, an end wall portion interconnecting the inner peripheral portion and the outer peripheral portion to at least partly define an internal space, and a connecting portion interconnecting the inner peripheral portion and the outer peripheral portion; and
   a lid overlying the internal space of the housing, the lid being joined to the inner peripheral portion of the housing by welding along an inner weld path, the lid being joined to the outer peripheral portion of the housing by welding along an outer weld path, the lid being joined to at least part of the connecting portion of the housing by welding along a connecting weld path connecting the inner weld path and the outer weld path, the inner weld path, the outer weld path, and the connecting weld path forming a continuous weld path.

2. The bicycle part according to claim 1, wherein the inner weld path includes a partly circular portion, and the outer weld path includes a partly circular portion.

3. The bicycle part according to claim 2, wherein the partly inner circular portion and the partly outer circular portion are concentrically arranged.

4. The bicycle part according to claim 1, wherein the connecting weld path includes a first connecting weld portion and a second connecting weld portion that connect the inner weld path and the outer weld path.

5. The bicycle part according to claim 1, wherein the continuous weld path is a closed loop.

6. The bicycle part according to claim 1, further comprising:
   an electronic circuit board provided in the internal space of the housing.

7. The bicycle part according to claim 6, further comprising:
   an electric power storage provided in the internal space of the housing at a position other than on the electronic circuit board.

8. The bicycle part according to claim 1, wherein the area is an opening.

9. A bicycle part comprising:
   a housing includes an inner peripheral portion at least partially defining an area, an outer peripheral portion spaced radially outward from the inner peripheral portion with respect to a center axis of the area, an end wall portion interconnecting the inner peripheral portion and the outer peripheral portion to at least partly define an internal space, and a connecting portion interconnecting the inner peripheral portion and the outer peripheral portion;
   a lid overlying the internal space of the housing, the lid being joined to the inner peripheral portion of the housing by welding along an inner weld path, the lid being joined to the outer peripheral portion of the housing by welding along an outer weld path, the lid being joined to at least part of the connecting portion of the housing by welding along a connecting weld path connecting the inner weld path and the outer weld path;
   a hub axle supporting the housing; and
   a hub body rotatably disposed around the center axis.

10. The bicycle part according to claim 9, wherein the housing is non-rotatably with respect to the hub axle.

11. The bicycle part according to claim 9, further comprising a sprocket support structure rotatably disposed around the center axis to transmit a driving force to the hub body while rotating in a driving rotational direction around the center axis.

12. The bicycle part according to claim 9, further comprising
a detected part provided to the sprocket support structure; and
a rotation detection sensor provided in the internal space of the housing, the rotation detection sensor being configured to detect the detected part to detect rotation of the sprocket support structure around the center axis.

\* \* \* \* \*